(12) United States Patent
Dobbie

(10) Patent No.: US 6,885,169 B2
(45) Date of Patent: Apr. 26, 2005

(54) SYSTEM AND METHOD FOR CHARGING RECHARGEABLE BATTERIES

(76) Inventor: Curtis Henry Dobbie, 30 Faulder Avenue, Westmere, Auckland (NZ)

( * ) Notice: Subject to any disclaimer, the term of this patent is extended or adjusted under 35 U.S.C. 154(b) by 21 days.

(21) Appl. No.: 10/399,862

(22) PCT Filed: Oct. 23, 2001

(86) PCT No.: PCT/NZ01/00234

§ 371 (c)(1),
(2), (4) Date: Apr. 28, 2003

(87) PCT Pub. No.: WO02/35679

PCT Pub. Date: May 2, 2002

(65) Prior Publication Data

US 2004/0041540 A1 Mar. 4, 2004

(30) Foreign Application Priority Data

Oct. 26, 2000 (NZ) .................................................. 507798

(51) Int. Cl.$^7$ ............................................. H01M 10/44
(52) U.S. Cl. ...................................................... 320/141
(58) Field of Search ................................. 320/141, 130, 320/131, 124, 125, 128, 133, 139, 145, 157, 159, 160, 162

(56) References Cited

U.S. PATENT DOCUMENTS

| | | | |
|---|---|---|---|
| 4,829,225 A | 5/1989 | Podrazhansky et al. | 320/14 |
| 4,857,419 A | 8/1989 | Jinnai et al. | 429/13 |
| 5,680,031 A | 10/1997 | Pavlovic et al. | 320/21 |
| 5,905,363 A | 5/1999 | Helbing et al. | 320/131 |
| 5,998,968 A | * 12/1999 | Pittman et al. | 320/130 |

FOREIGN PATENT DOCUMENTS

| | | |
|---|---|---|
| WO | WO96/17426 | 6/1996 |
| WO | WO98/31088 | 7/1998 |

* cited by examiner

Primary Examiner—Edward H. Tso
(74) Attorney, Agent, or Firm—Jacobson Holman PLLC

(57) ABSTRACT

A method for charging at least one rechargeable battery is described where a plurality of short duration high magnitude positive current pulses are delivered to the battery. Each pulse is followed by a period of positive average charging current and then a negative current pulse. This cycle is repeated a number of times followed by a large negative current pulse and possibly a rest period. Both the duration and magnitude of each pulse or period may be pseudo randomly varied.

17 Claims, 3 Drawing Sheets

SYSTEM AND METHOD FOR CHARGING RECHARGEABLE BATTERIES

This is a nationalization of PCT/NZ01/00234 filed Oct. 23, 2001 and published in English.

FIELD OF INVENTION

The invention relates to a system and method for charging rechargeable batteries using a unique charging waveform.

BACKGROUND OF INVENTION

A battery consists of one or more cells. Over time the amount of charge that can be stored in a rechargeable battery decreases leading to shorter and shorter periods of battery effectiveness until the battery is able to store so little charge that it is deemed worthless and discarded.

Factors that act to reduce to amount of charge that can be stored in the cells of a rechargeable battery include the fact that the charging surface per unit area of a cell is never even nor of identical impedance resulting in uneven charge layering. Uneven charge layering results in charged "hot spots" across the charging surface. As the battery cycles through charging and discharging, the surface per unit area capacity imbalance increases with the inactive areas of the surface increasing until the cell or cells are deemed unserviceable.

A second factor that acts to reduce the amount of charge that can be stored in a rechargeable battery is the memory effect. This effect occurs when the battery is subjected to DC recharging before the battery has been fully discharged.

A third factor is the uneven charge layering caused by even DC charging which reduces the capacity of the cells.

A fourth factor that some battery designs suffer from e.g. Nickel Cadmium that also reduces the amount of charge that can be stored in the cells of a rechargeable battery, is dentrite growth. Dentrites are highly resistive filaments that "grow" from one plate to the other in the cell through the electrolyte separator. Dentrites effectively cause a resistance discharge within the cells. Dentrite growth is caused by even DC charging of the battery.

SUMMARY OF INVENTION

It is therefore an object of the present invention to provide a method for charging at least one rechargeable battery which goes some way to overcoming the abovementioned disadvantages, or which will at least provide the public with a useful choice.

In a first aspect the present invention consists in a method for charging at least one rechargeable battery characterised in that current delivered to the battery comprises or includes a plurality of short duration positive current pulses, wherein each positive current pulse having a magnitude substantially greater than the rated charge current for a given battery, said rated charge current being for a standard charge period eg: 1 hour.

Preferably current delivered to the battery comprises or includes a plurality of short duration negative current pulses, wherein each negative current pulse having a magnitude less than a corresponding positive current pulse.

Preferably current delivered to the battery comprises or includes a plurality of periods of positive average charging current.

Preferably the positive pulse has a magnitude of at least twice the average of the positive average charging current.

Preferably each positive current pulse is substantially shorter in duration compared to a corresponding period of positive average charging current.

Preferably each negative current pulse contains between $1/5$th and $1/10$th of the energy of a corresponding period of positive average charging current.

Preferably the energy from each negative current pulse is stored and reused in subsequent charging.

Preferably each negative current pulse is of substantially shorter duration compared to a corresponding period of positive average charging current.

Preferably current delivered to the battery comprises or includes a plurality of rest sections with no current.

Preferably current delivered to the battery comprises or includes a plurality of large negative current pulses.

Preferably a first current cycle comprising a positive current pulse, followed by a period of positive charging current followed by a negative current pulse followed by a rest period, said first current cycle delivered to a battery for a plurality of periods.

Preferably said period is between 5 and 50 milliseconds.

Preferably a second current cycle comprising a large negative pulse followed by a rest section, each second current cycle delivered to a battery following a plurality of first current cycles.

Preferably the duration of each pulse or period is varied.

Preferably the duration of each pulse or period is pseudo randomly varied.

Preferably the magnitude of each pulses or period is varied.

Preferably the magnitude of each pulse or period is pseudo randomly varied.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples.

BRIEF DESCRIPTION OF THE DRAWINGS

One preferred form of the present invention will now be described with reference to the accompanying drawings in which.

DETAILED DESCRIPTION

Figure 1:
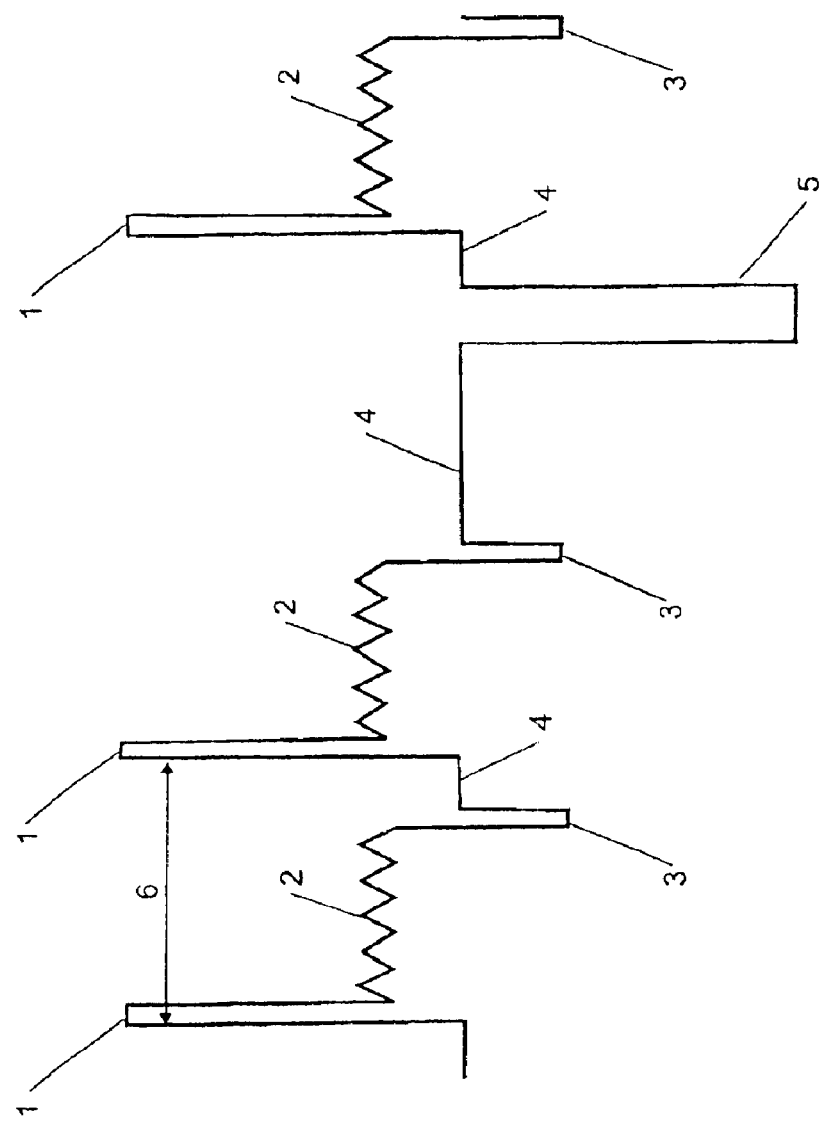
FIG. 1 is a diagram showing a preferred embodiment of charging waveform according to the present invention.

FIG. 1 shows several periods of the preferred form charging waveform of the present invention. The charging waveform according to one embodiment of the present invention can be divided into five different sections. The unlock section 1 is preferably a current pulse of a substantial magnitude and short duration. For example the duration might be 500 $\mu$S and of a magnitude of at least twice the rated charge current of any given battery (often this is specified for a standard charge period of 1 hour). The current pulse may have a leading edge spike and may also assist in charging the battery.

The current pulse acts to unlock the loaded higher impedance areas of the battery. This phenomenon is thought to occur due to the high current forcing all areas of the electrode, (active and inactive) to a higher voltage for a short period. This in turn causes the inactive areas to be partially restored.

The charge section 2 includes a period of positive current flow into the battery, for a substantially longer period than unlock section 1. For example charge section 2 may be a series of random current pulses each of which may have leading edge spikes. In FIG. 1 the charge section 2 is illustrated with a triangle waveform ripple with a DC offset. However it will be appreciated by one skilled in the art that the main purpose of the Charge section 2 is to provide the bulk of the energy to charge the battery. In this fashion any net positive current into the battery would suffice, although in view of the previously recited objects of the invention some variation, eg: random would be preferred.

Charging waveform section 3 is the discharge section. Discharge section 3 contains ideally between $1/7$th and $1/10$th of the energy of charge section 2. Discharge section 3 aids in the removal of dentrites from the battery and helps reduce uneven charge layering (hills and valleys in the battery). Preferably discharge section 3 is of short duration relative to the duration of charge section 2. Discharge section 3 also helps to reduce the float voltage of the battery which aids in more efficient charging. Discharge section 3 may have a leading edge spike and always follows a period of charging shown by charge section 2.

Unlock section 1, charge section 2 and discharge section 3 form the basic charging waveform.

Charging waveform section 4 shows rest periods in the charging wave. Rest periods 4 are included in most cycles of the waveform and may vary in duration.

Section 5 is a large discharge section. These pulses are introduced to the charging waveform to unlock dentrite growth foundations and further reduce uneven charge layering. By unlocking dentrite growths and reducing the hills and valleys to a more uniform level, more charge can be stored on the battery and the battery lasts longer than a battery subjected only to DC charging. Section 5 also further assists cell float voltage reduction. Preferably the large discharge sections have a period of between 5 and 20 milliseconds, may have a leading edge spike and may be a series of pulses. Large discharge sections 5 may not occur in every period of the charging waveform. Large discharge sections 5 may occur after every predetermined number of charging waveform cycles or may occur after a random number of charging waveform cycles. The energy lost in the discharge sections may be reused in subsequent charge sections.

Charging waveform section 6 shows one cycle of normal charging in the battery charger of the invention. A normal charging period begins with an unlock section 1 followed by charging section 2. A discharge section 3 and rest period 4 follow the charging section before the cycle repeats. Variations in the cycle may include varying the length of the charging sections 2, varying the length of the rest period and the introduction of the large discharge sections 5. Preferably the period of a normal charging wave 6 is between 5 and 50 milliseconds. This may change for larger battery types. In one embodiment of the present invention the unlock section 1 is followed by the charge section 2 and then the discharge section 3, although it is possible that the objects of the invention would still be achieved by any permutation of ordering the 3 sections.

Figure 2:
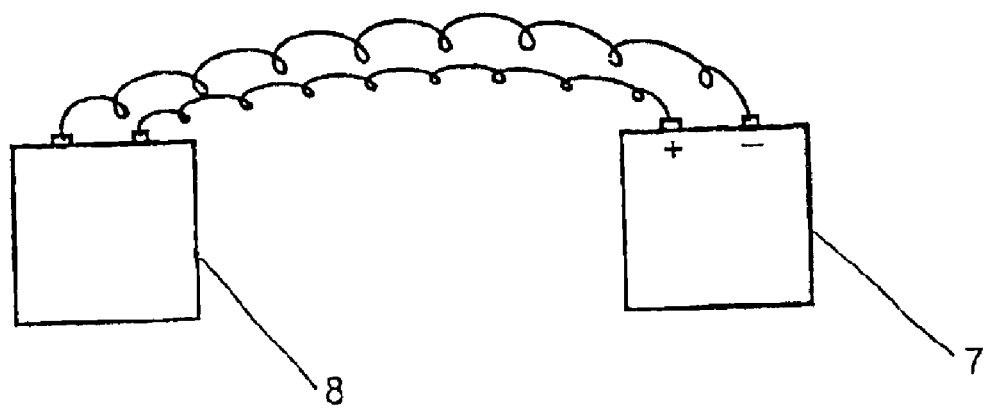
FIG. 2 is a block diagram showing the charger according to the preferred embodiment of the present invention attached to a battery for charging.

FIG. 2 shows a charger of the invention charging a battery. The battery 7 may be for example a lead acid battery, a nickel cadmium battery, a nickel metal hydride battery or a lithium battery. It will be appreciated by one skilled in the art other rechargeable batteries may equally be charged using the charger of the present invention. In use the battery 7 is attached to charger 8. Charger 8 charges the battery using a charging waveform such as that shown in FIG. 1. The charger indicates when the battery is fully charged, and automatically switches to a maintenance charge if required by the battery type, otherwise the charge is terminated.

Charger 8 contains means to produce the waveform and means to determine the length and magnitude of each section within the waveform. The duration of some of the sections within the waveform may be determined using random or pseudo random variations. Similarly the magnitude of each of the sections within the waveform may be determined using random or pseudo random variations. It is thought that the variation reduces the formation of large crystal deposits on the electrodes and instead produces a more amorphous charge layer. The cumulative effective of the short duration high magnitude current pulse and the pseudo random variations have been proven in trials to reduce the degradation that normally occurs in the capacity of rechargeable batteries over time.

Figure 3:
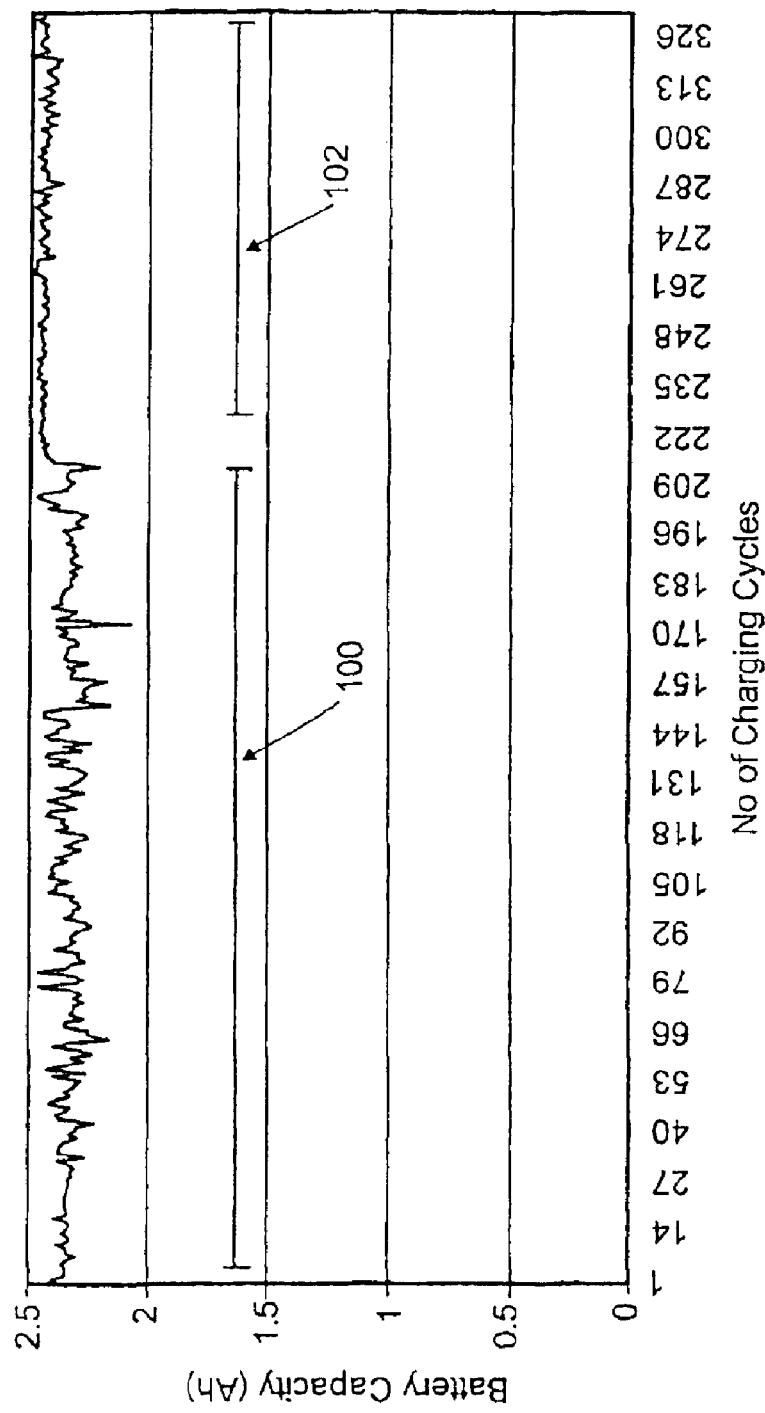
FIG. 3 is a graph showing the charging history of a battery recharged according to the present invention.

Referring to FIG. 3, we see the charging history of a 2.2 Ah Nicad 12V battery using the present invention. The first period of charging 100 illustrates an improvement over the rated capacity as various configurations were trialed. The second period 102 illustrates an average capacity after charging of 2.45 Ah, which is 11% higher than the rated capacity for a new battery—and this is after 200 charging cycles. This second period relates to the present invention configured as the preferred embodiment described herein. It will be appreciated by one skilled in the art this is a significant improvement over prior art systems.

The charger may be arranged to charge only a single battery at any one time or may be arranged to charge multiple batteries simultaneously.

What is claimed is:

1. A method for charging at least one rechargeable battery, said method comprising the steps of
    delivering current to the battery having a plurality of charging cycles including at least a first cycle comprising a short duration positive current impulses, a period of positive charging current, said period of positive charging current being at least a significant portion of a duration of said first cycle, a short duration negative current pulse, and a rest period wherein each positive current impulse having a magnitude substantially greater than the rated charge current for a given battery and said short duration being substantially less than a period of said first cycle, and wherein each negative current pulse having a magnitude less than a corresponding positive current impulse.

2. The method for charging at least one rechargeable battery as claimed in claim 1, wherein each positive current impulse has a magnitude of at least twice the average of the positive average charging current.

3. The method for charging at least one rechargeable battery as claimed in claim 1, wherein each positive current pulse is substantially shorter in duration compared to a corresponding period of positive average charging current.

4. The method for charging at least one rechargeable battery as claimed in claim 1, wherein each negative current pulse contains between $1/7$th and $1/10$th of the energy of a corresponding period of positive average charging current.

5. The method for charging at least one rechargeable battery as claimed in claim 1, wherein the energy from each negative current pulse is stored and reused in subsequent charging.

6. The method for charging at least one rechargeable battery as claimed in claim 1, wherein each negative current pulse is of substantially shorter duration compared to a corresponding period of positive average charging current.

7. The method for charging at least one rechargeable battery as claimed in claim 1, wherein current delivered to the battery includes a plurality of rest sections with no current.

8. The method for charging at least one rechargeable battery as claimed in claim 1, wherein current delivered to the battery includes a plurality of large negative current pulses.

9. The method for charging at least one rechargeable battery as claimed in claim 1, wherein said first current cycle is delivered to a battery for a plurality of periods.

10. The method for charging at least one rechargeable battery as claimed in claim 9, wherein said period is between 5 and 50 milliseconds.

11. The method for charging at least one rechargeable battery as claimed in claim 9, wherein a second current cycle comprising a large negative pulse is followed by a rest section, each second current cycle is delivered to a battery following a plurality of first current cycles.

12. The method for charging at least one rechargeable battery as claimed in claim 1, wherein the duration of one of each pulse, impulse and period is varied.

13. The method for charging at least one rechargeable battery as claimed in claim 12, wherein the duration of one of each pulse, impulse and period is pseudo randomly varied.

14. The method for charging at least one rechargeable battery as claimed in claim 1, wherein the magnitude of one of each pulse, impulse and period is varied.

15. The method for charging at least one rechargeable battery as claimed in claim 14, wherein the magnitude of one of each pulse, impulse and period is pseudo randomly varied.

16. The method for charging at least one rechargeable battery as claimed claim 2, wherein each positive current impulse has a magnitude of at least ten times the average of the positive average charging current.

17. The system for charging at least one battery, wherein the battery is charged according to the method claimed in claim 1.

* * * * *